June 5, 1951 B. FLAM 2,555,688
VIBRATORY MECHANISM FOR MOLDS
Filed June 30, 1947 2 Sheets-Sheet 1

INVENTOR.
Bernard Flam,
BY John Flam
ATTORNEY

June 5, 1951  B. FLAM  2,555,688
VIBRATORY MECHANISM FOR MOLDS
Filed June 30, 1947  2 Sheets-Sheet 2

INVENTOR.
Bernard Flam,
BY John Flam
ATTORNEY.

Patented June 5, 1951

2,555,688

UNITED STATES PATENT OFFICE 2,555,688

VIBRATORY MECHANISM FOR MOLDS

Bernard Flam, Sherman Oaks, Calif.

Application June 30, 1947, Serial No. 758,097

1 Claim. (Cl. 259—72)

This invention relates to the molding of objects from plastic materials, such as cement or concrete.

It is now well known that the cast article (which may be hollow tile or concrete blocks) is rendered much stronger and less pervious to moisture when the mold is vibrated during the operation of filling the mold. This vibration causes the material to be more closely compacted. The vibration is performed at a rapid rate and is quite intense.

It is one of the objects of this invention to provide a simple and inexpensive vibrator for this purpose, and particularly to make it possible to reduce to an innocuous degree the transmission of vibrations to those parts of the molding mechanism that are not intended to be vibrated.

In order to obtain these results, use is made of rubber supports for the vibrating elements, which supports can sustain the vibrations imparted to these elements and yet are incapable of materially affecting the rigid structure upon which the rubber supports are mounted.

It is, accordingly, another object of this invention to provide rubber mounts for the vibrating parts arranged effectively to accomplish these results.

It is still another object of this invention to make it possible very simply to service the mechanism by replacement of the mounts when continued use has made them unfit for further operation.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claim.

Referring to the drawings.

Figure 3:
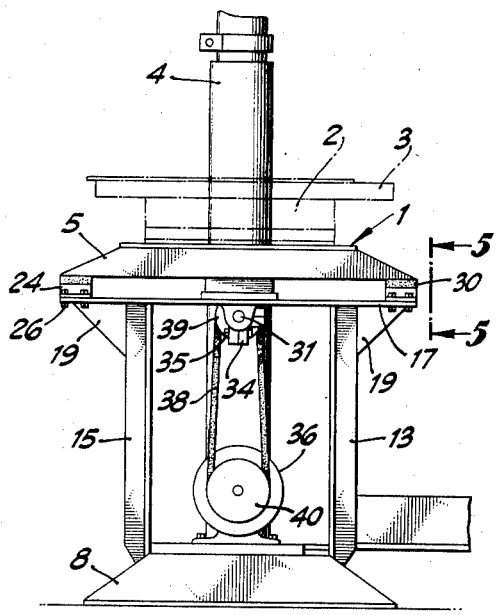
Fig. 3 is an end elevation thereof.
Figure 4:
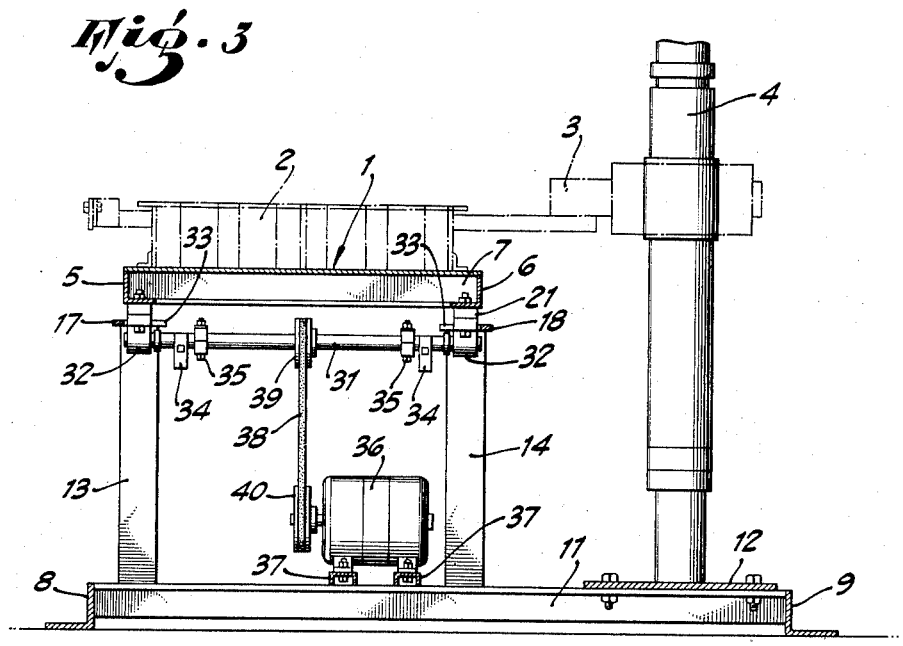
Fig. 4 is a sectional view, taken substantially along the plane corresponding to line 4—4 of Fig. 2.

A plate 1, such as of sheet metal, is shown in a horizontal position, serving as a support for a mold 2 (Figs. 3 and 4). This plate 1 is appropriately supported and vibrated as hereinafter described.

Accordingly, vibrations are imparted to the mold structure 2.

The mold structure 2 may be appropriately clamped to the top of a plate 1 in any convenient manner during the process of filling the mold. It is also adapted to be placed upon, and removed from, the plate 1 by mechanism indicated by reference character 3 (Figs. 3 and 4). This transfer mechanism is shown as supported by aid of a column 4 appropriately provided at one side of the apparatus. Since this invention does not relate to the manner of placing the mold upon the vibrating plate 1, or its removal therefrom, further details of this part of the apparatus are unnecessary.

The plate 1 is attached to the top of a pair of side members 5 and 6. These may be in the form of angle irons, and extend transversely adjacent the end edges of the plate 1. Further to stiffen the plate 1, additional angle irons 7 may be provided along the side edges of the plate 1.

In order to provide a support for the plate 1 and the transverse members 5 and 6, a stationary structural framework is provided, shown diagrammatically in the drawings. Thus, there are end angle irons 8 and 9 which are adapted to be bolted to an appropriate foundation. Extending longitudinally between these angle irons 8 and 9 are a plurality of angle irons 10 and 11 having one flange horizontal to, and substantially on a level with, the top edges of the angle irons 8 and 9. The base formed by the elements 8, 9, 10, and 11 also serves conveniently for supporting the column 4 in any appropriate manner as, for example, by a foot plate 12.

A number of upright structural elements may be joined to the vertical flanges of the angle irons 10 and 11. In this instance, the T beams 13, 14, 15, and 16 are indicated. Additional cross-bracing may be provided as required.

The tops of the columns 13 and 15 are appropriately joined by a horizontal structural plate 17, and a similar structural plate 18 extends across the top of the columns 14 and 16. Ribs, such as 19, for providing additional rigidity may also be provided.

Figure 1:
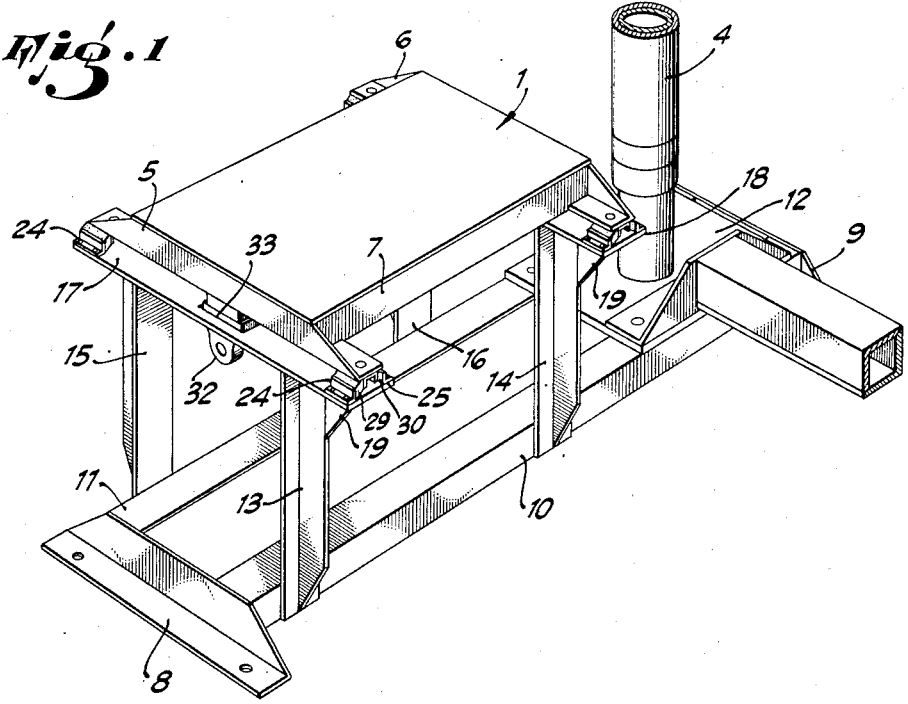
Figure 1 is a pictorial view, partly diagrammatic, of a vibratory mechanism embodying the invention.
Figure 2:
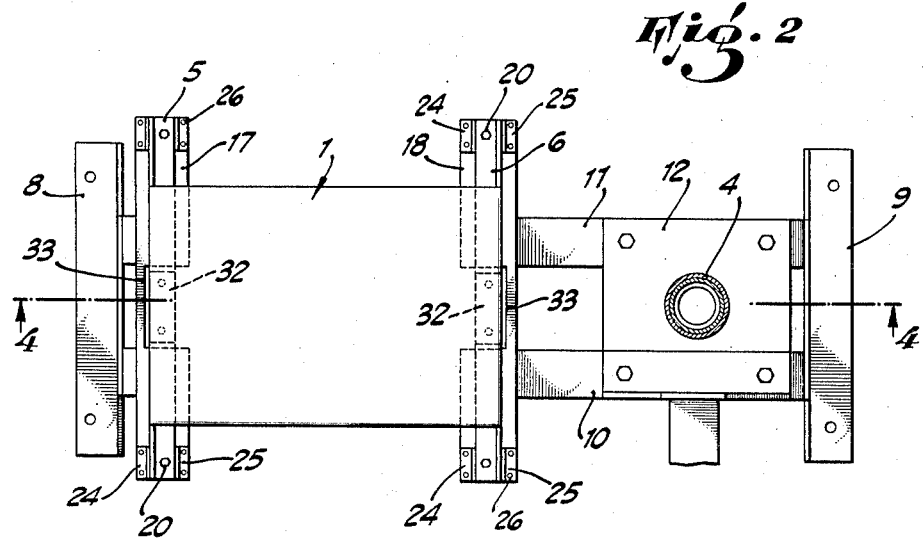
Fig. 2 is a plan view thereof.
Figure 5:
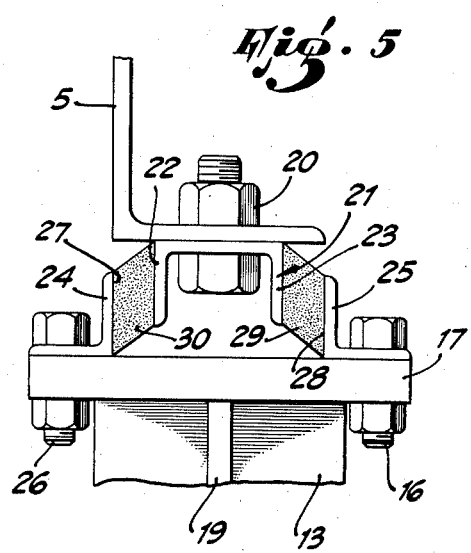
Fig. 5 is an enlarged fragmentary elevation, taken as indicated by the line 5—5 of Fig. 3.

The plates 17 and 18 extend transversely below the plate 1 and beyond the edges thereof to cooperate with the ends of the cross-members 5 and 6. At the ends of these cross-members floating mounts are provided. In the present instance there are four such mounts respectively adjacent to corners of the plate 1. Fig. 5 shows one of the mounts, corresponding to the right front corner of the apparatus as illustrated in Fig. 1. Since all of the other mounts are similar, it is necessary to describe only the one illustrated in Fig. 5.

Thus, attached as by the bolt 20 to the horizontal flange of angle iron 5, there is a channel 21 of relatively short length. This channel provides vertical parallel faces 22 and 23 that are transverse to the plate 1.

Short angle irons 24 and 25 are securely attached adjacent the edges of plate member 17, as by a plurality of bolts 26. The vertical legs of these angle irons 24 and 25 provide vertical surfaces 27 and 28 parallel to, but spaced from, the surfaces 22 and 23 respectively. Joining these parallel surfaces are the rubber blocks 29 and 30. These blocks are of rhomboid section. In this manner, the surfaces 22 and 27 and 23 and 28 are vertically displaced. The rubber blocks 29 and 30 may be made of either synthetic or natural rubber, and are preferably quite flexible. Those faces of the rubber blocks 29 and 30 which are in contact with the angle irons 24, 25 and the channel 21 may be appropriately bonded or secured thereto by a plastic adhesive.

The plate 1 is thus supported adjacent its four corners on floating rubber mounts. Accordingly, when vibration is imparted to the plate 1, these rubber mounts can sustain the vibration without transmitting any substantial amount of vibration to the stationary supporting structure.

Vibration of the plate 1 in this instance is effected by the aid of an unbalanced rotary shaft 31 (Figs. 3 and 4). This shaft is mounted for rotation underneath the plate 1 by the aid of the bearing standards 32, and has an axis of rotation substantially parallel with the plate 1. These bearing standards 32 are attached to the horizontal flanges of the angle irons 5 and 6. They may project downwardly through appropriate slots 33 formed in the plates 17 and 18.

This shaft 31 has mounted thereon the unbalanced weights 34, four being shown in this instance. These unbalanced weights may be in the form of split rectangular blocks tightened upon the shaft by the aid of bolts 35.

Rotation of the shaft 31 at a rapid rate transmits intense vibration to the plate 1 and thereby to the mold 2. The degree of vibration may be controlled by angular adjustment of the weights 34.

For rotating the shaft 31 there is shown an electric motor 36, mounted on the cross channels 37 supported on the angle irons 10 and 11. This electric motor is connected, as by the belt 38 and pulleys 39 and 40, to the shaft 31.

The inventor claims:

In a molding apparatus: a stationary support; a mold supporting plate above the support; transverse members attached to the plate, the ends of said members extending above the support; rubber elements connected between the ends and said support, each element having opposed generally parallel surfaces, one surface of said element being secured to said support and the other surface of said element to said transverse member; a shaft mounted on the plate for rotation about an axis substantially parallel to the plate; and unbalanced weights attached to the shaft and rotatable in a central plane substantially parallel to said surfaces.

BERNARD FLAM.

REFERENCES CITED

The following references are of record in the file of this patent:

UNITED STATES PATENTS

| Number | Name | Date |
| --- | --- | --- |
| 793,354 | Cox | June 27, 1905 |
| 1,908,104 | Bell | May 9, 1933 |
| 1,984,363 | Dietricks | Dec. 18, 1934 |
| 2,071,373 | Wurzback et al. | Feb. 23, 1937 |
| 2,091,414 | Newport et al. | Aug. 31, 1937 |

FOREIGN PATENTS

| Number | Country | Date |
| --- | --- | --- |
| 520,408 | Great Britain | Apr. 23, 1940 |